March 21, 1933. H. C. DREIBUSS ET AL 1,902,806
TRUCK BOLSTER
Filed Oct. 9, 1930   2 Sheets-Sheet 1
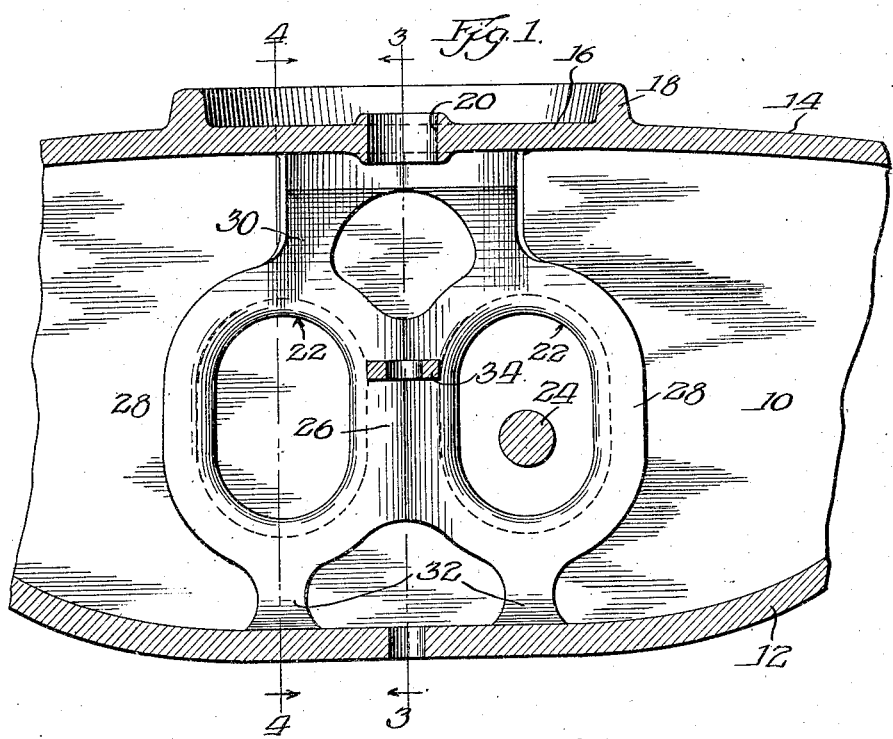
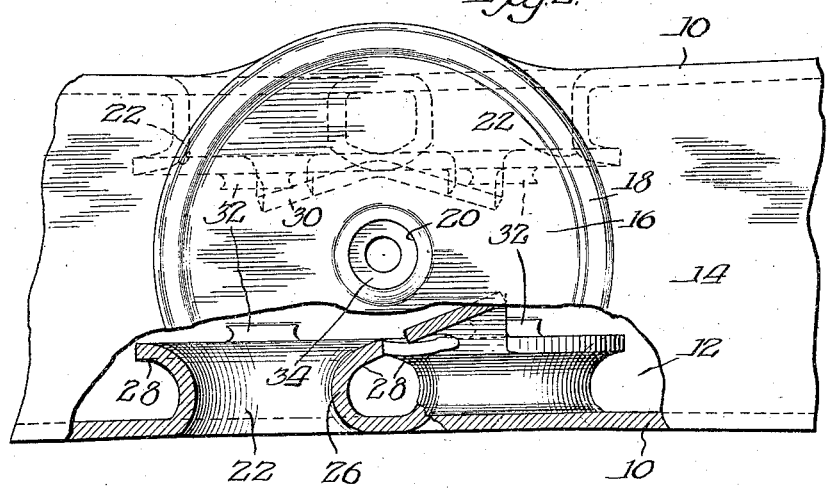
Witness:
R. B. Davison.
Inventors:
Harry C. Dreibuss +
George S. Chiles.
By Wilkinson, Huxley, Byron + Knight
Attys

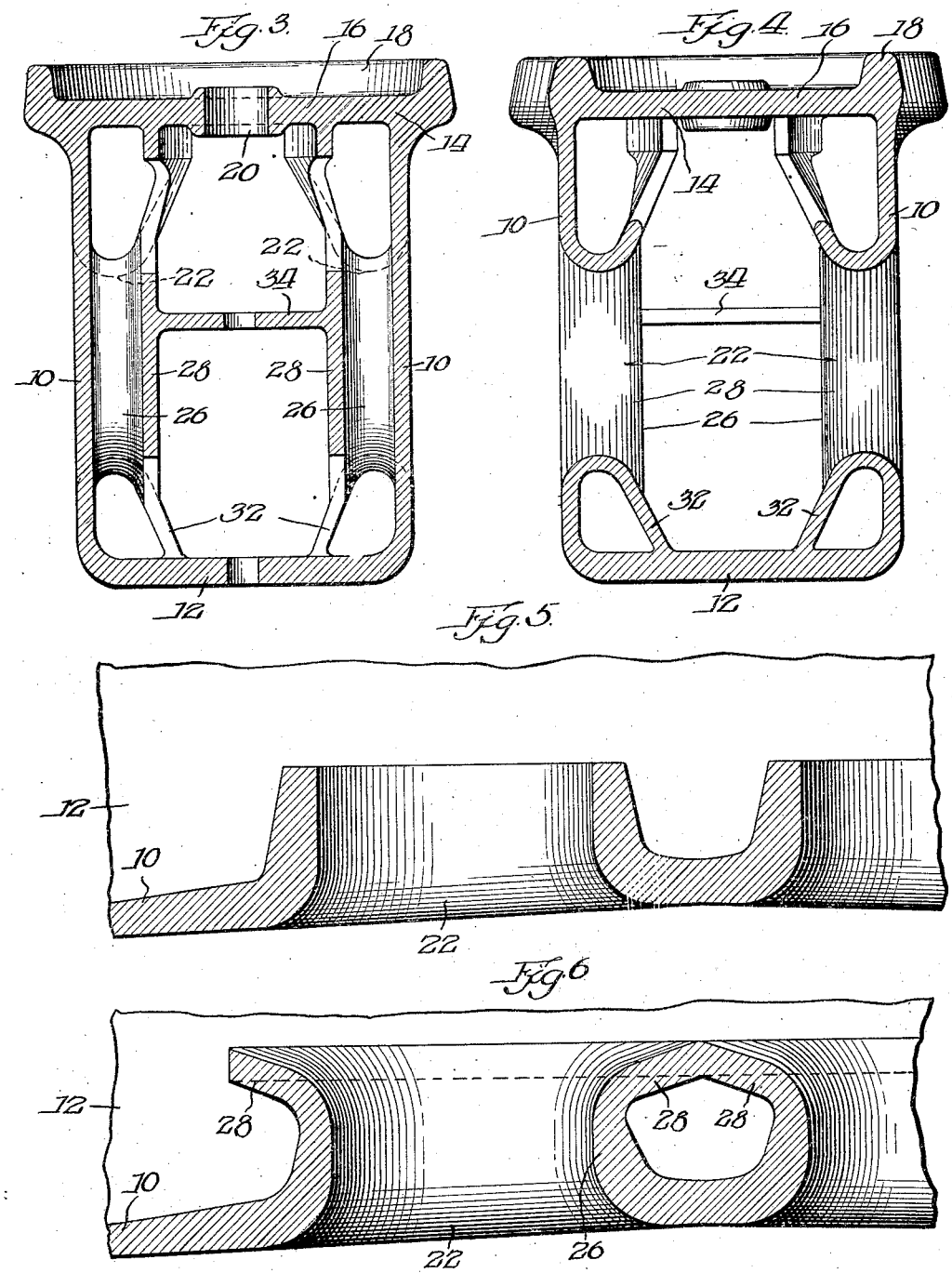

Patented Mar. 21, 1933

1,902,806

UNITED STATES PATENT OFFICE

HARRY C. DREIBUSS AND GEORGE S. CHILES, OF ST. LOUIS, MISSOURI, ASSIGNORS TO SCULLIN STEEL CO., OF ST. LOUIS, MISSOURI, A CORPORATION OF DELAWARE

TRUCK BOLSTER

Application filed October 9, 1930. Serial No. 487,488.

This invention relates to truck bolsters of the box type, and is illustrated as embodied in a bolster having central transverse openings through which a brake rod may extend. In many of its aspects, however, the invention is equally applicable to other types of bolsters and other parts thereof than that shown.

The invention may include a customary center plate formed as a part of the upper wall. The side walls may have suitable flanged openings therethrough and the flanges may preferably be extended to meet a wall adjacent the wall from which the flange extends for the purpose of reinforcement. In the illustrated embodiment, the flanges form the inner support for the center plate.

One object of this invention is to provide a truck bolster which is sufficiently strong to withstand any use to which it may be put and which may be cast more easily and more cheaply.

A further object of the invention is to provide a truck bolster in which the center plate is provided with suitable inner supports of the most efficient possible construction.

Another object of the invention is to provide a truck bolster having transverse openings through which may be passed a brake rod and which is suitably reinforced in the most efficient manner.

With these and various other objects in view, the invention may consist of certain novel features of construction and operation, as will be more fully described and particularly pointed out in the specification, drawings and claims appended hereto.

In the drawings which illustrate an embodiment of our invention,

Figure 1 is a fragmentary vertical longitudinal section of one embodiment of my invention; and Figure 2 is a fragmentary plan view of the embodiment shown in Figure 1, partly broken away to show the internal construction;

Figure 3 is a vertical central transverse section of the structure shown in Figure 1 taken along line 3—3 of Figure 1;

Figure 4 is a view taken along the line 4—4 of Figure 1; and

Figures 5 and 6 are fragmentary sectional views illustrating on an enlarged scale alternative forms of flanges which may be embodied in the structure of Figure 1 or in other parts of truck bolsters.

In all the embodiments of the invention which we have chosen for illustration, the bolster includes the side walls 10, the bottom 12 and the top 14. In accordance with the customary practice, these members are preferably integrally cast, together with the rest of the structure to be described. The top 14 includes the center plate 16 surrounded by bearing ring 18 and perforated king pin opening 20. In each of the side plates 10 are formed the openings 22 through which may be passed a suitable brake rod 24 if desired. One suitable construction in which such openings are provided, was disclosed in applicants' prior application, Serial No. 444,180, filed April 14, 1930, and it should be understood that the remainder of bolster may be constructed as shown therein, or according to the modifications taught by this application. According to the present invention, the internal structure of the bolster has been considerably simplified. Each of the side openings 22 is provided with a re-entrant flange 26, which is in the form of a continuation of the metal through which the hole is formed. As these flanges join the walls in which they are formed with continuous non-intersecting lines of metal, difficulties such as undesirable internal stresses are avoided.

In the constructions shown in Figures 1 to 4 and 6, flanges 26 are flared outwardly, as at 28. These outwardly flared portions extend preferably entirely around the opening and greatly reinforce the same. However, as shown in Figure 5 the flared portion may be omitted along certain parts of the flanges. In all the forms it is best to retain the upper and lower portions of the flares as it is desirable that these extend vertically upwardly as at 30 and vertically downwardly as at 32. The upward extensions 30 from the two adjacent flares preferably meet each other and in combination join and support the center plate 16. The downward extensions 32 may conveniently join the bottom 12 as shown best in Figure 4, though, of course, the downward extensions may be dispensed with when this additional strength can be dispensed with. As shown most clearly in Figures 2, 3 and 4 both the upward and downward extensions are preferably formed to meet the center plate and bottom respectively at the points where they will do the most good. Thus each upper extension 30 meets the center plate in a line that starts fairly close to the transverse center thereof, but which recedes toward the outer side at the longitudinal center, this junction not only causes the center plate support to conform somewhat to the contour of the center plate, but it also results in having the various parts of the support lying in planes at angles to one another, thereby having a maximum strength. Between the side openings 22, the extensions 28 of the flanges are integrally joined thus forming a tube. This tubular formation of course greatly increases the strength of the flanges and therefore of the entire center structure.

If even greater strength is desired in the bolster, the walls 10 may be slightly thickened around the side openings 22 as shown in Figures 5 and 6. This thickening may be carried on into the flange as illustrated. It has also been found that this thickening of the walls is desirable around all their openings which may be provided in the various walls of the bolsters. When the thickened walls are combined with the re-entrant flanges an exceedingly strong structure is produced.

As before mentioned, the re-entrant flanges 26 need not necessarily be flared, but may be left in the shortened form shown in Figure 6. Of course even in that form they are preferably extended to provide the proper reinforcing connections between the walls.

From the drawings and in the light of the foregoing description it may be seen that the load on the central portion of the center plate is supported by extensions 30 which form columns and which transmit their load chiefly to the side walls 10 through the flared flanges 26. At the same time, the side walls are prevented from buckling and are restrained from their breathing action by the flanges around the openings and by the connecting web 34.

As is perhaps most clearly shown by Figure 4, the construction provided is extremely simple. This results not only in a saving of metal, but also in simplified cores and casting operations, which results in greater economy in the manufacture of these truck bolsters without loss of strength.

It is to be understood that we do not wish to be limited by the exact embodiments of the device shown which are merely by way of illustration and not limitation, as various and other forms of the device will of course be apparent to those skilled in the art without departing from the spirit of the invention or the scope of the claims.

We claim:

1. A box type of bolster having a wall with an opening therethrough, the portion of said wall adjacent said opening being thicker than the remote portion of said wall and a re-entrant flange surrounding said opening.

2. A box type of bolster having a wall with an opening therethrough, the portion of said wall adjacent said opening being thicker than the remote portion of said wall and extended to form a flange surrounding said opening, said flange being flared at its end.

3. A boxlike truck bolster having a wall and an opening therethrough, said wall being extended to form a flange around said opening, said flange being provided with a short, steeply-diverging flare at its end.

4. A boxlike truck bolster having a wall and an opening therethrough, said wall being extended to form a flange around said opening, said flange being flared completely around its end.

5. A truck bolster of the box type having a wall and a tubular reinforcing member formed tangent to said wall.

6. A truck bolster including a wall having a pair of openings therethrough, said openings having flanges and said flanges being extended and integrally joined between said openings to form a tubular structure.

7. A truck bolster including a center plate, and side walls, said side walls each having a pair of openings therein and being extended to form flanges around said openings, said flanges being curved upwardly close to said walls and being extended to join said center plate to help support the same.

8. A truck bolster of the box type including a center plate, side walls and inner members for supporting the central portion of said center plate, said inner members being in part parallel with the side walls, and intersecting said center plate in lines extending at acute angles from said walls.

9. A truck bolster of the box type including a center plate, side walls and inner members for supporting said center plate, said inner members intersecting said center plate in spaced lines extending at angles to said side walls.

10. A truck bolster of the box type including a center plate, side walls and inner members for supporting said center plate, said inner members intersecting said center plate in spaced lines extending at angles to said side walls, said members extending from the intersection to the side walls and joining therewith without intersection.

11. A truck bolster of the box type including a center plate, side walls and a bottom, said side walls each having a hole therethrough through which a brake rod may pass, a flange around said hole said flange being extended upwardly in close proximity to the connected wall and joining the center plate in a line at an angle to said wall.

12. A truck bolster of the box type including a center plate, side walls and a bottom, said side walls each having a hole therethrough through which a brake rod may pass, a flange around said hole said flange being extended upwardly in close proximity to the connected wall and joining the center plate in a line at an angle to said wall, said flanges on opposite walls connected by a member integral therewith in the vertically central portion of said bolster.

13. A truck bolster of the box type including a center plate, side walls and a bottom, said side walls each having a hole therethrough through which a brake rod may pass, a flange around said hole said flange being extended upwardly in close proximity to the connected wall and joining the center plate in a line at an angle to said wall, said flange being extended downwardly to join the bottom member.

14. A box type of bolster having a wall with an opening therethrough, the portion of said wall adjacent said opening being thicker than the remote portion of said wall, the wall being gradually tapered from one thickness to the other, and a re-entrant flange surrounding said opening.

15. A box type of bolster having a wall with an opening therethrough, and a re-entrant flange surrounding said opening; said wall and flange being thicker adjacent said opening than remote therefrom, and being gradually tapered from one thickness to the other.

Signed at St. Louis, Missouri, this 4th day of October, 1930.

HARRY C. DREIBUSS.
GEORGE S. CHILES.